US008589700B2

(12) United States Patent
Herman et al.

(10) Patent No.: US 8,589,700 B2
(45) Date of Patent: Nov. 19, 2013

(54) DATA WHITENING FOR WRITING AND READING DATA TO AND FROM A NON-VOLATILE MEMORY

(75) Inventors: Kenneth Herman, San Jose, CA (US); Matthew Byom, Campbell, CA (US); Michael J. Smith, San Francisco, CA (US); Tahoma M. Toelkes, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1105 days.

(21) Appl. No.: 12/398,090

(22) Filed: Mar. 4, 2009

(65) Prior Publication Data

US 2010/0229005 A1    Sep. 9, 2010

(51) Int. Cl.
*H04L 9/28* (2006.01)

(52) U.S. Cl.
USPC .............. 713/193; 380/277; 380/29; 711/103

(58) Field of Classification Search
USPC ....................... 713/193; 380/277, 29; 711/103
See application file for complete search history.

(56) References Cited

U.S. PATENT DOCUMENTS

| | | | |
|---|---|---|---|
| 5,404,485 A | 4/1995 | Ban | |
| 7,152,138 B2 | 12/2006 | Spencer et al. | |
| 7,284,133 B2 * | 10/2007 | Watanabe et al. | 713/189 |
| 7,349,987 B2 * | 3/2008 | Redlich et al. | 709/244 |
| 2002/0019935 A1 | 2/2002 | Andrew et al. | |
| 2004/0123020 A1 | 6/2004 | Gonzalez et al. | |
| 2005/0050342 A1 * | 3/2005 | Boivie et al. | 713/193 |
| 2005/0232415 A1 * | 10/2005 | Little et al. | 380/28 |
| 2006/0218412 A1 * | 9/2006 | Hars et al. | 713/193 |
| 2006/0224902 A1 * | 10/2006 | Bolt | 713/193 |
| 2007/0136576 A1 | 6/2007 | Chambers et al. | |
| 2008/0065905 A1 * | 3/2008 | Salessi | 713/193 |
| 2008/0114994 A1 * | 5/2008 | Iyer et al. | 713/193 |
| 2008/0151618 A1 | 6/2008 | Sharon et al. | |
| 2008/0158948 A1 | 7/2008 | Sharon et al. | |
| 2008/0172563 A1 * | 7/2008 | Stokes | 713/193 |

FOREIGN PATENT DOCUMENTS

| | | |
|---|---|---|
| KR | 10-2004-0101342 | 12/2004 |
| WO | WO 2008/078314 | 7/2008 |

OTHER PUBLICATIONS

Jiang, Wei, et al., "Enhancing Reliability and Flexibility of a System-on-chip Using Reconfigurable Logic", Circuits and Systems, 2005. 48th Midwest Symposium vol. 1, on p. 879-882.

Liu, Lan, et al., "Implementation of AES as a CMOS Core", Electrical and Computer Engineering, 2003. IEEE CCECE 2003. Canadian vol. 1, p. 53-56.

* cited by examiner

*Primary Examiner* — Kambiz Zand
*Assistant Examiner* — Aubrey Wyszynski
(74) *Attorney, Agent, or Firm* — Van Court & Aldridge LLP

(57) ABSTRACT

Systems, apparatuses, and methods are provided for whitening and managing data for storage in non-volatile memories, such as Flash memory. In some embodiments, an electronic device such as media player is provided, which may include a system-on-a-chip (SoC) and a non-volatile memory. The SoC may include SoC control circuitry and a memory interface that acts as an interface between the SoC control circuitry and the non-volatile memory. The SoC can also include an encryption module, such as a block cipher based on the Advanced Encryption Standard (AES). The memory interface can direct the encryption module to whiten all types of data prior to storage in the non-volatile memory, including sensitive data, non-sensitive data, and memory management data. This can, for example, prevent or reduce program-disturb problems or other read/write/erase reliability issues.

16 Claims, 5 Drawing Sheets

DATA WHITENING FOR WRITING AND READING DATA TO AND FROM A NON-VOLATILE MEMORY

FIELD OF THE INVENTION

This can relate to systems, methods, and apparatuses for whitening and managing data for storage in a non-volatile memory, such as NAND Flash memory.

BACKGROUND OF THE DISCLOSURE

NAND Flash memory, as well as other types of non-volatile memories, are commonly used in electronic devices for mass storage. For example, portable media players often include Flash memory to store music, videos, and other media.

In order to decrease the size of these electronic devices while maintaining or increasing memory capacities, Flash and other types of memory cells are continually being scaled down and becoming more densely packed. This can cause program-disturb and other problems that reduce reliability in writing to and reading from the non-volatile memory. In particular, during programming of one or more pages (e.g., the unit of data that can be written to the non-volatile memory at one time), if the data bits being stored in the memory cells are nearly all the same value (e.g., nearly all ones or all zeros), the programming voltages applied to these memory cells can have a strong electric field effect on nearby memory cells. This can cause the affected memory cells to be incorrectly or partially programmed, which may increase the likelihood that the data will be incorrectly interpreted during a subsequent read operation.

SUMMARY OF THE DISCLOSURE

Systems, apparatuses, and methods are provided for whitening or otherwise managing data for storage on a non-volatile memory, such as a NAND Flash memory. "Whitening" may generally refer to increasing the randomness of a sequence of data, which can reduce the likelihood of the data sequences having a highly disproportionate number of ones to zeros. The data whitening can be performed using an encryption module, such as a block cipher based on the Advanced Encryption Standard (AES). Since the encryption module may also be used to provide security for sensitive information (e.g., personal information), the disclosed embodiments can provide data whitening without requiring hardware dedicated to this purpose.

In some embodiments, an electronic device, such as a media player, is provided. The electronic device can include a system-on-a-chip (SoC) and a non-volatile memory, such as Flash memory. The SoC can include an encryption module and a memory interface. The memory interface can communicate with the non-volatile memory to read data from and program data onto the non-volatile memory responsive to read and write commands, respectively. In some embodiments, the memory interface can include a translation layer that may act as an interface between the non-volatile memory and the SoC's file system, which may issue the read and write commands.

To prevent program-disturb or other reliability issues, the memory interface can direct the encryption module to encrypt all data that is written to the non-volatile memory, and not just sensitive data that the file system requests to be encrypted. The memory interface can encrypt non-sensitive data, where encryption is not requested, as well as any memory management data that is stored on the non-volatile memory. The memory management data, sometimes referred to as metadata, can include any data generated by the memory interface for use in managing the storage of sensitive or non-sensitive data. In some embodiments, the metadata can include memory map information which can keep track of the mapping between the address provided by the file system for the data (or the "logical address") and the address of the non-volatile memory at which the data will be or has been stored (or the "physical address").

The encryption module of the SoC can encrypt and decrypt data using one or more initial values, which may sometimes be referred to as "encryption seeds." For AES engines, the encryption seeds can include a key and an initialization vector ("IV"). The memory interface can generate or select the encryption seeds based on the type of data that is being read or programmed (e.g., sensitive data, non-sensitive data, or metadata). In some embodiments, the memory interface can receive a command to read or write data from the file system, and the memory interface can detect whether the information is sensitive or non-sensitive. If the data is sensitive, the memory module can encrypt the data using a secure privacy key and initialization vector provided by the file system. Otherwise, for non-sensitive data, the memory interface can use a predetermined, whitening key and an IV that may be generated based on the logical address of the data.

Using this technique, the memory interface can whiten sensitive and non-sensitive data without using an encryption seed that can depend on the physical address of the data. The sensitive and non-sensitive data can therefore be moved between different physical locations in the non-volatile memory (e.g., during garbage collection or wear leveling, where data is moved to consolidate valid information and free blocks) without having to decrypt the data based on a previous physical address and re-encrypt the data based on the new physical address.

In some embodiments, the metadata generated by the memory interface may be maintained in the non-volatile memory. In these embodiments, the memory interface can encrypt the metadata for whitening before the metadata is stored in the non-volatile memory. For an AES engine, the memory interface can seed the AES engine with the predetermined whitening key and an IV that may be generated based on the physical address at which the metadata is stored. Because the IV may be based on the physical address, unlike for sensitive or non-sensitive information, the memory interface may perform decryption and re-encryption on each page of metadata when moving the metadata between different physical locations (e.g., during garbage collection).

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
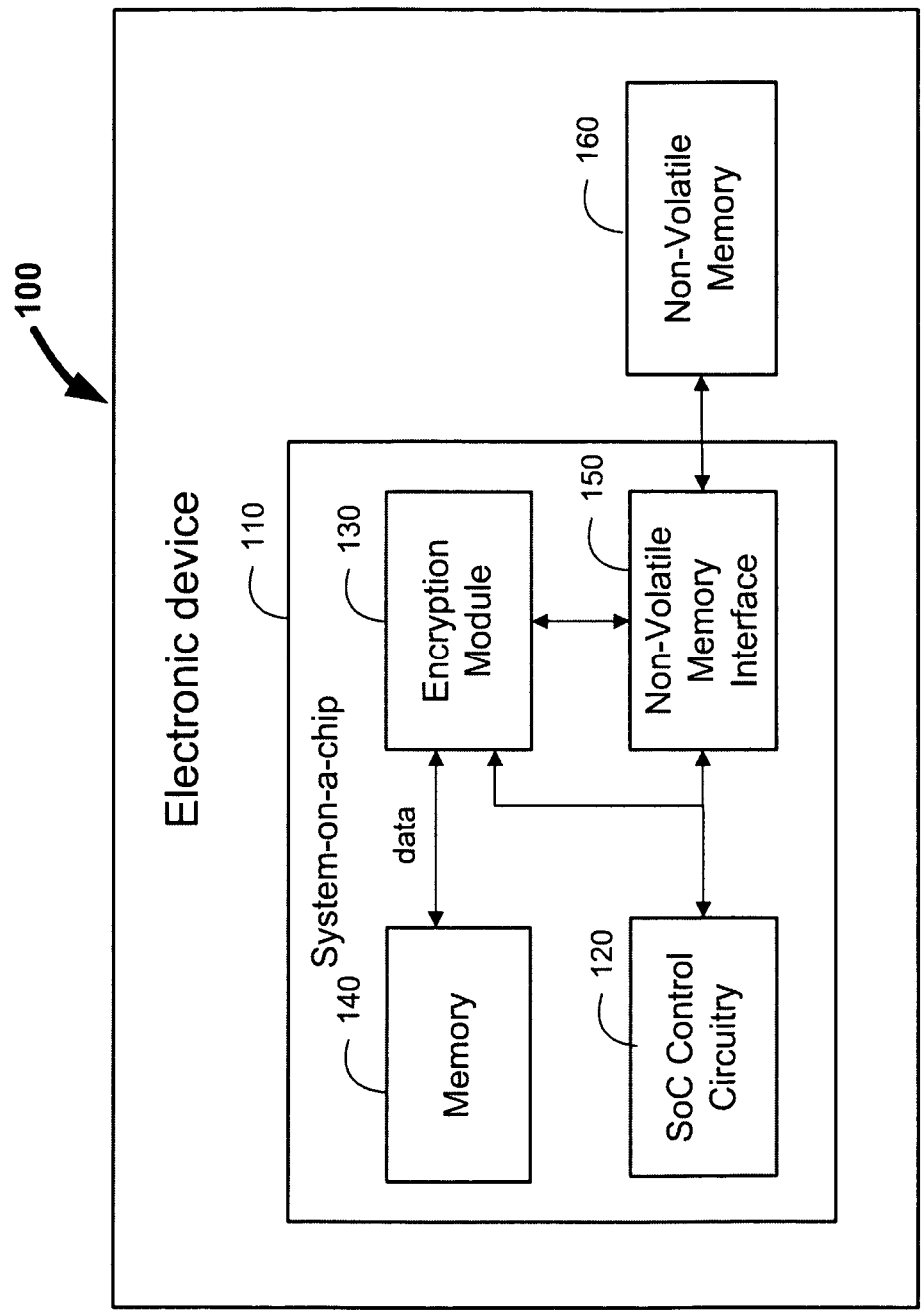
FIG. 1 is a schematic view of an electronic device configured in accordance with an embodiment of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), pocket-sized personal computers, a personal digital assistance (PDA), a desktop computer, a laptop computer, and any other suitable type of electronic device.

Electronic device 100 can include system-on-a-chip (SoC) 110 and non-volatile memory 160. Non-volatile memory 160 can be a NAND Flash memory based on floating gate technology, and can be organized into "blocks" that may each be erasable at once, and further organized into "pages" that may each be programmable and readable at once. Each page of non-volatile memory 160 can be addressed using a physical page address. While FIG. 1 (as well as later figures) and the various disclosed embodiments may be described in terms of using Flash technology, any other type of non-volatile memory can be implemented instead. For example, non-volatile memory 160 can include NAND Flash, NOR Flash, any future generation non-volatile memory, or a combination thereof. Also, in some embodiments, non-volatile memory 160 may be implemented on system-on-a-chip 110 instead of off-chip, and electronic device 100 can include other components, such as a power supply or any user input or output devices, which are not depicted in FIG. 1 to prevent overcomplicating the figure.

System-on-a-chip 110 can include SoC control circuitry 120, encryption module 130, memory 140, and non-volatile memory interface 150. SoC control circuitry 120 can control the general operations and functions of SoC 110 and its other components. For example, responsive to user inputs or the instructions of an application, SoC control circuitry 120 can issue read or write commands to non-volatile memory interface 150 to obtain or store data from or in non-volatile memory 160. SoC control circuitry 120 can include any combination of hardware, software, and firmware, and any components, circuitry, or logic operative to drive the functionality of electronic device 100.

Memory 140 can include any suitable type of volatile or non-volatile memory, such as dynamic random access memory (DRAM), synchronous dynamic random access memory (SDRAM), double-data-rate (DDR) RAM, cache memory, or read-only memory (ROM). Memory 140 can include a data source that can temporarily store data for programming into or reading from non-volatile memory 160. In some embodiments, memory 140 can store firmware or software applications that may be executed by SoC control circuitry 120 or memory interface 150, can provide temporary storage for the firmware or software, or a combination thereof.

Non-volatile memory interface 150 can include any suitable combination of hardware and software, which may act as a driver or interface (e.g., Flash interface) between SoC control circuitry 120 and non-volatile memory 160. For example, memory interface 150 can interpret the read or write commands from SoC control circuitry 120 to generate read and program instructions compatible with the bus protocol of non-volatile memory 160. Memory interface 150 can perform these and any other suitable functions to manage the pages and blocks of non-volatile memory 160, including directing encryption module 130 to whiten data that will be stored on non-volatile memory 160 and moving pages of data between physical locations of non-volatile memory 160 during wear leveling or garbage collection, discussed below. While memory interface 150 is shown as a separate module from SoC control circuitry 120, in some embodiments, these modules may share hardware or software components (or both), and some of the functionality may be interchangeable.

Encryption module 130 can be or may include any hardware or software, or combination thereof, configured to perform encryption and decryption based on a suitable cipher. For example, encryption module 130 can be based on the Advanced Encryption Standard (AES), Data Encryption Standard (DES), or RSA. Encryption module 130 can provide security for sensitive data, such as personal information or billing information, stored in non-volatile memory 160 or transmitted/received to/from electronic device 100 (e.g., using communications circuitry such as Wi-Fi™ circuitry not shown in FIG. 1). In addition to providing security, the encryption algorithm used by encryption module 130 may provide the added feature of whitening or randomizing the data it encrypts. Encryption module 130 may therefore be directed to encrypt data even if that data is not sensitive, so that this data can be whitened prior to being written into non-volatile memory 160. This way, program-disturb and other reliability issues can be reduced.

Encryption module 130 can encrypt and decrypt data using one or more "encryption seeds" provided by SoC control circuitry 120 or non-volatile memory interface 150, which may be required by the encryption algorithm to perform encryption or decryption. In some embodiments, and particularly for AES-based encryption modules, the encryption seeds can include a key and an initialization vector ("IV"). To recover the original unencrypted data from encrypted data, the encryption seeds used for decryption may need to be the same as the seeds originally used for encryption. Thus, various features are disclosed below in connection with FIGS. 2-5 that illustrate various techniques an electronic device can use to manage and generate these encryption seeds.

Figure 2:
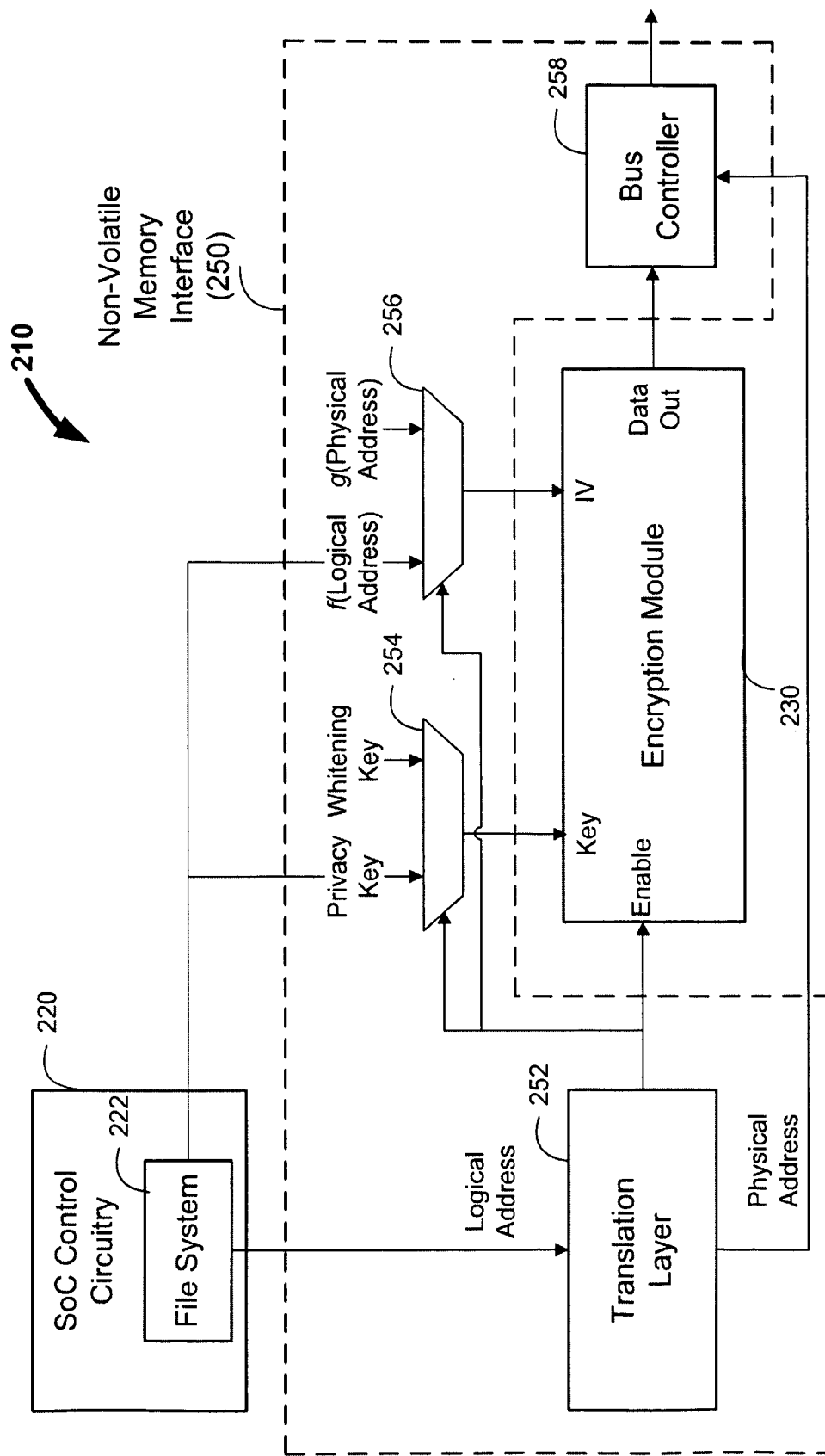
FIG. 2 is a schematic view of a system-on-a-chip implemented on an electronic device and configured in accordance with an embodiment of the invention.

Turning now to FIG. 2, a schematic view of a system-on-a-chip (SoC) 210 is shown. SoC 210 can be a more detailed view of SoC 110 or can be a completely different implementation of a system-on-a-chip. SoC 210 can include SoC control circuitry 220, encryption module 230, and non-volatile memory interface 250, which may each have any of the features and functionalities described above in connection with their like-named components of FIG. 1, and vice versa. For example, in some embodiments, encryption module 230 can be or can include an Advanced Encryption Standard (AES) engine, which may have a key and an IV input to obtain encryption seeds and an enable input to enable or disable encryption of data received from a data input (not shown).

While no memory modules are depicted in FIG. 2, it should be understood that one or more suitable buffers or other temporary storage modules can be provided between any of the various components shown in FIG. 2. These memory modules can be located at any suitable position on SoC 210, such as internal to SoC control circuitry 220, external to SoC control circuitry 220 (e.g., memory 140 of FIG. 1), or internal or external to non-volatile memory interface 250.

SoC control circuitry 220 can provide the general functionalities of the electronic device (e.g., electronic device 100 of FIG. 1). For example, SoC control circuitry 220 can execute any applications (e.g., music or other media applications) initiated by the user and can include the operating system of the electronic device. During operation, the applications and other programs or firmware may need to store or retrieve data from mass storage (e.g., non-volatile memory 160 of FIG. 1). SoC control circuitry 220 may allocate this data as "sensitive" or "non-sensitive" information based on a variety of factors, such as the type of information, which application is being executed, or the particular user operating the electronic device. "Sensitive data" may generally refer to any information that is provided for storage (e.g., from file system 222, discussed below) with an instruction to encrypt the data. Sensitive data can include, for example, personal information and credit card information.

SoC control circuitry 220 can include file system 222 to issue the read and write commands instructed by the application or operating system. File system 222 can include any suitable type of file system, such as a File Allocation Table (FAT) file system. With each read or write command, file system 222 can provide a logical address to indicate where the data should be read or written. File system 222 can also provide information on whether the operating system or application has determined that the data is sensitive. For sensitive data, file system 222 can provide a privacy key and an initialization vector with the read or write command. If the data is non-sensitive, file system 222 may not provide valid encryption seeds. For example, file system 222 can provide NULL values in place of valid encryption seeds.

File system 222 may provide read and write requests, along with the logical address and encryption seeds, using a protocol that is not directly compatible with the non-volatile memory implemented on the electronic device (e.g., NAND Flash). For example, the logical addresses provided by file system 222 may use conventions or protocols typical of a hard-drive-based system. A hard-drive-based system, unlike Flash memory, can overwrite a memory location without first performing a block erase and does not need to perform wear leveling to increase the lifespan of the device. Therefore, SoC 210 can include non-volatile memory interface 250, which can perform any memory-specific (e.g., Flash-specific) or vendor-specific (or both) functions to handle file system requests in a manner suitable for the non-volatile memory.

Non-volatile memory interface 250 can include translation layer 252, multiplexers 254 and 256, and bus controller 258. In some embodiments, translation layer 252 may be a Flash translation layer. Translation layer 252 can interpret the read and write commands from file system 222 and translate the read and write commands to instructions suitable for the non-volatile memory. More particularly, on a write/program operation, translation layer 252 may not write data directly to the logical address received from file system 222, because the logical address may not correspond to a free, erased physical location on the non-volatile memory. Instead, translation layer 252 can convert the logical address received from file system 222 to a free physical address on the non-volatile memory. On a read operation, translation layer 252 can determine the actual, physical address of the stored data that corresponds to the received logical address.

Translation layer 252 can generate memory management data (or "metadata") to maintain this mapping between logical and physical addresses. Memory "management data" or "metadata" can include any data not provided by the file system, and that may instead be generated by the components of interface 250 (e.g., translation layer 252). Translation layer 252 can also perform any other suitable tasks for managing storage on the non-volatile memory, including performing garbage collection or wear leveling, discussed below.

Using memory management data (e.g., the determined physical addresses), translation layer 252 can provide read and write requests to bus controller 258, and can issue erase requests to bus controller 258 to free storage space on the non-volatile memory. Bus controller 258 can communicate with the non-volatile memory using a bus protocol employed by the non-volatile memory to execute the requested read, write, and erase operations. In some embodiments, bus controller 258 may include a "memory technology driver" that can communicate with a vendor-specific non-volatile memory.

Non-volatile memory interface 250 can enable encryption module 230 to whiten data prior to having bus controller 258 write the data onto the non-volatile memory. In some embodiments, translation layer 252 can enable encryption module 230 to encrypt any and all types of data or metadata (e.g., sensitive data, non-sensitive data, or memory management data) prior to storage, so that the resulting whitened data can reduce or minimize the occurrence of program/read/erase-disturbs. To whiten the data, translation layer 252 can determine which encryption seeds (here, a key and an initialization vector) to provide to encryption module 230. The encryption seeds may and often should be selected such that the encryption seeds can be recovered when decryption is performed and such that the secure encryption keys provided by file system 222 are used when available.

Translation layer 252 can control multiplexer 254 to select a key for use by encryption module 230. In some embodiments, translation layer 252 can choose between a privacy key and a predetermined whitening key based on the type of data being encrypted/whitened. Translation layer 252 can select the privacy key, which may be provided by file system 222, responsive to detecting that a read or write command for sensitive data has been received. For other types of data (e.g., non-sensitive data or non-metadata), translation layer 252 can select the predetermined whitening key since a valid privacy key may not be provided. The whitening key can take on any of a variety of values, and in some embodiments may be hard-coded or hard-wired into interface 250. The whitening key may have a value suitable for whitening, instead of just for security. For example, using device simulations or mathematical models, the value of the whitening key may be predetermined to provide a higher degree of whitening (compared to other potential whitening keys) for various possible values of the data. Thus, in some embodiments, the value of the whitening key may be independent of the data being read or written. The value of the whitening key may also be location-independent (e.g., independent of the data's corresponding logical or physical addresses).

Translation layer 252 can control multiplexer 256 to select an initialization vector for use by encryption module 230. Like with the privacy key, file system 222 can provide an initialization vector with a read or write command corresponding to sensitive information. This initialization vector may be based on the logical address received with the read or write command. File system 222 can provide an IV based on the logical address for added security. In particular, when file system 222 issues write commands to store the same data at multiple logical addresses, the resulting encrypted data will not be the same.

For other types of data (e.g., non-sensitive data or metadata), translation layer 252 can select between using an IV based on a logical or physical address. More particularly, interface 250 can compute an initialization vector based on a physical address or a logical address of the information being stored or retrieved, and translation layer 252 can control multiplexer 256 to select between these vectors. As discussed above, using an initialization vector that is based on an address (whether logical or physical) can provide added security. Also, because translation layer 252 can maintain metadata with valid logical and physical addresses, encrypting data based on a logical or physical address may enable interface 250 to reconstruct the IV for decryption at a later time.

Translation layer 252 can choose an IV based on a physical address to encrypt or decrypt metadata, because metadata may not be associated with a logical address. That is, because the metadata may be generated by interface 250 instead of provided by file system 222, a valid IV cannot be generated from a logical address. In some embodiments, for any information that will be or has been stored in the non-volatile memory, translation layer 252 may select an IV based on a physical address when a logical address is not available (e.g., metadata or any other suitable information).

Translation layer 252 can enable encrypting or decrypting of non-sensitive data using an IV based on the logical address. In some embodiments, for any information that will be or has been stored in the non-volatile memory, translation layer 252 can enable encryption of the information using a logical address whenever possible, such as for non-sensitive or sensitive data. This can enable efficient memory management, particularly during garbage collection or wear leveling. Translation layer 252 can perform wear leveling and garbage collection to ensure that program and erase operations may be spread evenly among the non-volatile memory and to free up blocks for erasing. Wear leveling and garbage collection can involve moving pages from one physical address to a new physical address. By using an IV based on a logical address, which may be unaffected by changes in the physical address, translation layer 252 can move sensitive and non-sensitive data without having to decrypt and re-encrypt the data. That is, translation layer 252 may not need to decrypt the stored data based on a previous physical address and re-encrypt the data using a new physical address, as may be necessary for moving metadata (which is encrypted based on the physical address). Moving data between physical locations on a non-volatile memory will be described in greater detail below in connection with FIG. 5.

Figure 3:
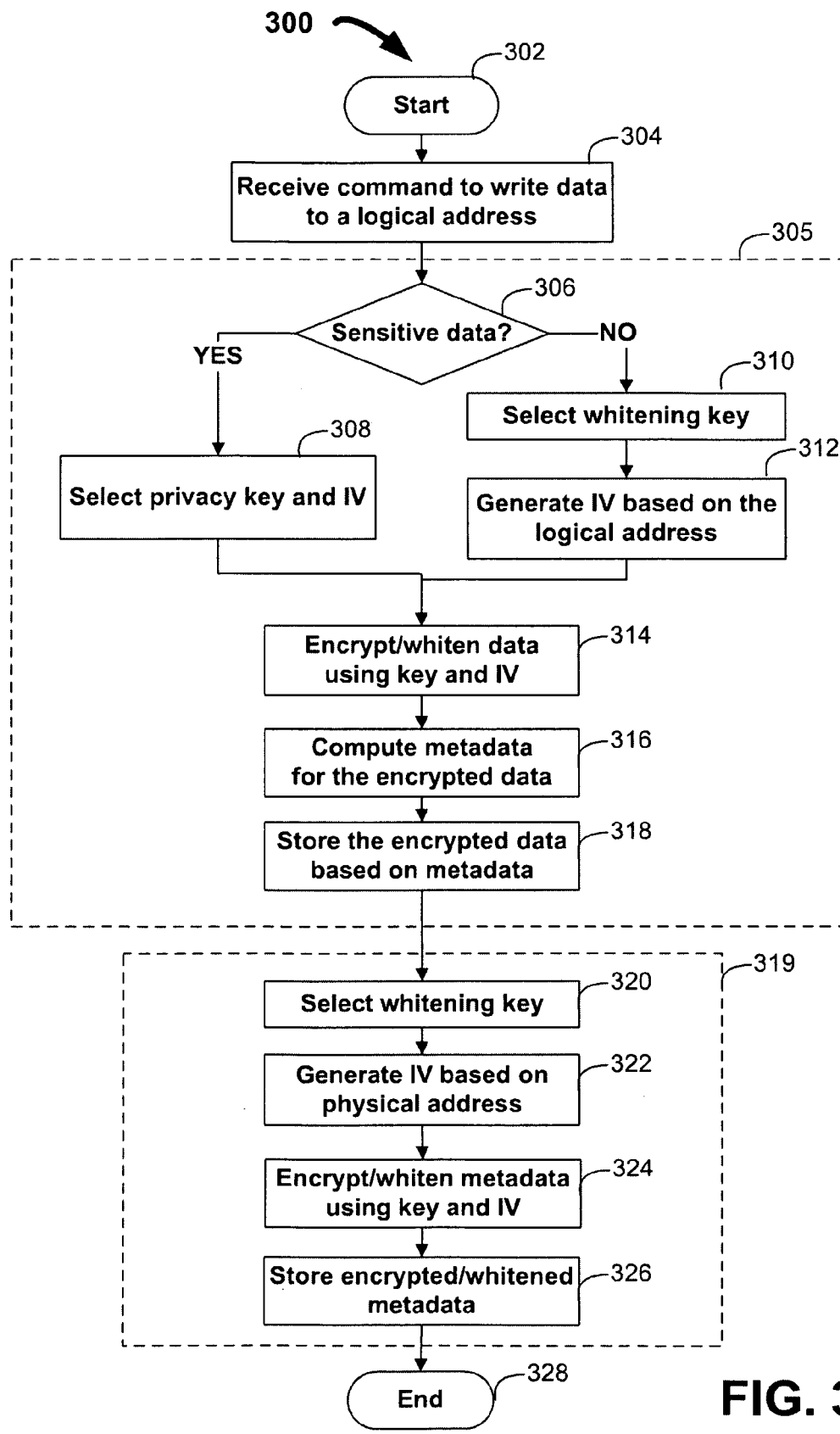
FIG. 3 is a flowchart of an illustrative process for writing data to a non-volatile memory in accordance with an embodiment of the invention.
Figure 4:
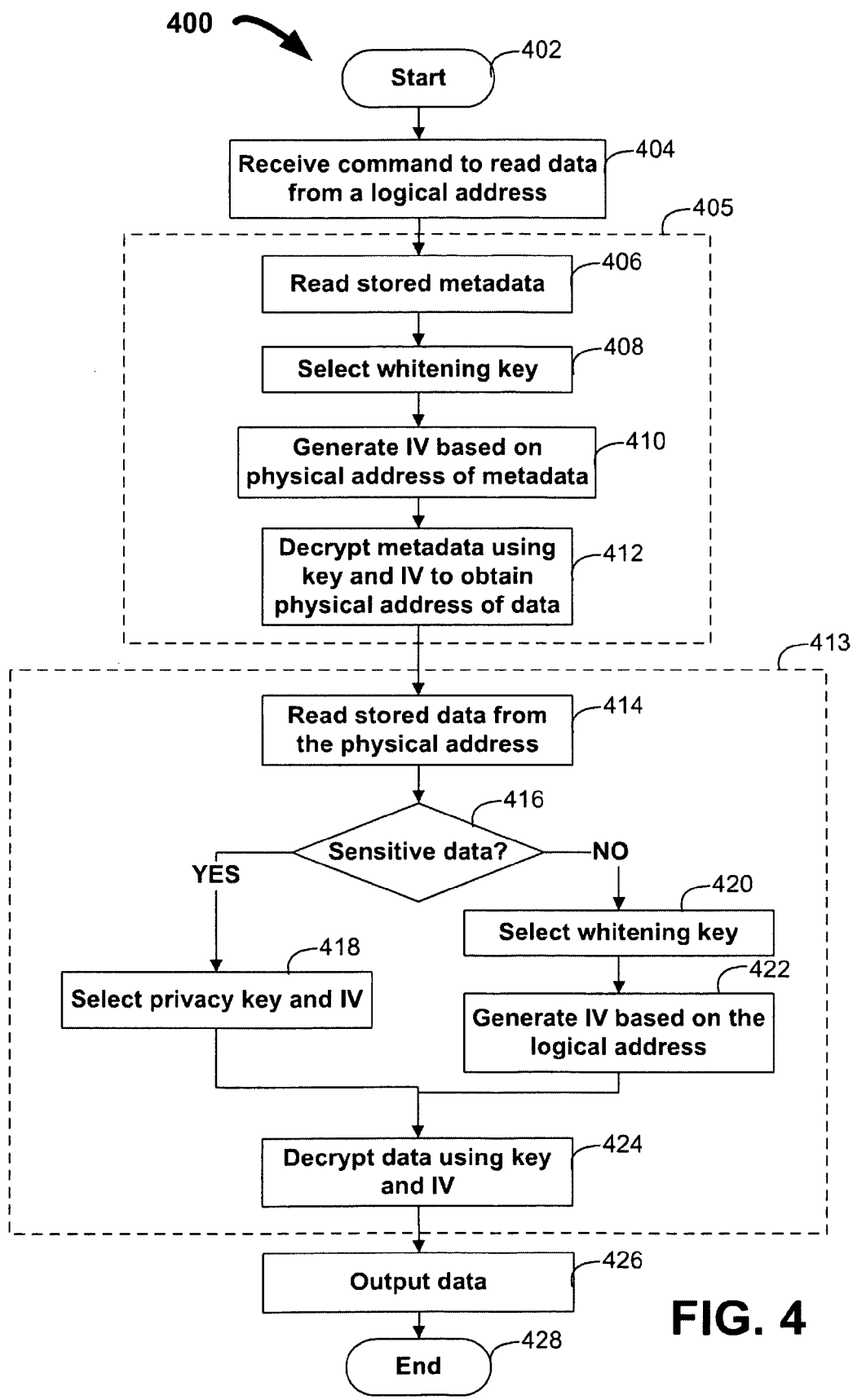
FIG. 4 is a flowchart of an illustrative process for reading data from a non-volatile memory in accordance with an embodiment of the invention.
Figure 5:
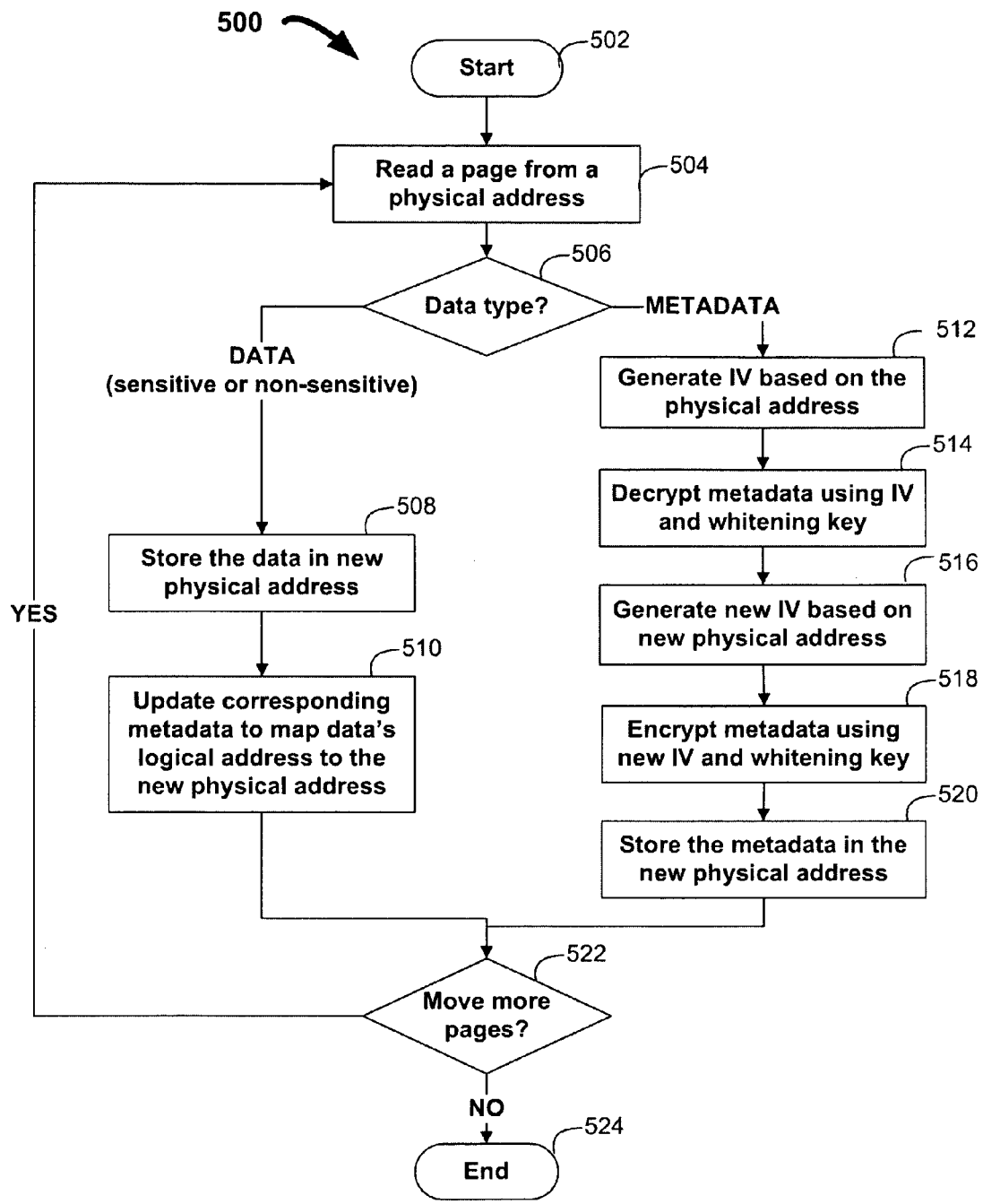
FIG. 5 is a flowchart of an illustrative process for moving data between physical pages of a non-volatile memory in accordance with an embodiment of the invention.

Referring now to FIGS. 3-5, flowcharts of illustrative processes are shown for whitening data for storage on a non-volatile memory, such as Flash memory. The steps of these processes can be executed by a memory interface, such as interface 250 of FIG. 2, or by any component or combination of components of an electronic device. However, for purposes of clarity and not of limitation, the processes will be described as being performed by a memory interface.

Turning first to FIG. 3, a flowchart of process 300 is shown for whitening data for storage in a non-volatile memory (e.g., NAND Flash memory) responsive to a write command. Process 300 can begin at step 302. At step 304, the memory interface can receive a command to write data at a logical address. In some embodiments, the write command can be received from a file system (e.g., FAT file system) and the data can be stored on on-chip memory (e.g., memory 140 of FIG. 1). To determine which encryption seeds to use in whitening the data, the memory interface can determine whether the data is sensitive information or non-sensitive information at step 306. The memory interface can detect that the data is sensitive if valid encryption seeds (e.g., a privacy key and IV) are received as part of the write command. If the memory interface determines that the data is sensitive, the memory interface can select the received privacy key and IV at step 308. Otherwise, values for these encryption seeds may not be provided by the file system and process 300 can move instead to step 310. At step 310, the memory interface can select a predetermined whitening key and, at step 312, can generate an initialization vector based on the logical address of the data.

From step 308 or 312, process 300 can continue to step 314. At step 314, the memory interface can encrypt the data using the selected key and the selected or generated initialization vector. This can involve asserting the enable signal of the encryption module, such as encryption module 230 of FIG. 2, while providing the selected/generated key and IV to the encryption module. This way, for sensitive data, the data can be secured in the manner specified by the file system, and can be whitened as well. Non-sensitive data, which does not need to be encrypted, may be encrypted nonetheless using a key designed for whitening in order to prevent program disturb or other read/write/erase problems.

Moving to step 316, the memory interface can compute metadata for the data that is to be programmed onto the non-volatile memory. For example, for Flash memory, the memory interface can include a Flash translation layer that can generate metadata in the form of a mapping between the logical address (received at step 304) and a physical address of the Flash memory. Using the mapping and any other suitable metadata, the memory interface (e.g., via a bus controller) can program the encrypted/whitened data onto the non-volatile memory at the computed physical address. Thus, steps 306 through 318 (outlined by dotted lines in FIG. 3 and labeled as sub-process 305) can represent the steps taken by the memory interface to store the data as instructed by the file system.

The memory interface may need to maintain the metadata computed at step 316 to, for example, be able to recall the physical address of the stored data when a subsequent command to read the data is received. Process 300 can therefore continue to the steps of sub-process 319 for storing the metadata in the non-volatile memory. First, at step 320, the memory interface can select the whitening key, which may or may not be the same as the whitening key selected for non-sensitive data (e.g., at step 310). Then, at step 322, the memory interface can generate an initialization vector based on a physical address of the non-volatile memory. This step can involve the memory interface determining where to store the metadata in the non-volatile memory, and then computing the initialization vector using the determined physical address. In some embodiments, the memory interface can maintain (e.g., in a memory internal to the memory interface) a pointer into the non-volatile memory to indicate where the metadata is stored for later retrieval, or the memory interface can dedicate particular pages within each block for metadata storage.

Continuing to step 324, the memory module can encrypt the metadata using the selected key and the generated initialization vector. This way, prior to storage in the non-volatile memory at step 326, the metadata can also be whitened by an encryption module to avoid potential program-disturb or other read/write/erase problems. Process 300 can then end at step 328, having stored in the non-volatile memory whitened sensitive or non-sensitive data (as instructed by the file system) and whitened memory management data associated with the stored data.

FIG. 4 is a flowchart of illustrative process 400, which the memory interface can execute to process read commands received from, for example, a file system. Process 400 can be viewed as the inverse operation of process 300. Accordingly, the description of FIG. 4 will remain brief with the understanding that the above descriptions of the steps in FIG. 3 may apply to corresponding steps in FIG. 4.

Process 400 can start at step 402. Then, at step 404, the memory interface can receive a command to read data from a logical address. To identify the physical address of the non-volatile memory where the requested data is stored, memory interface can execute the steps of sub-process 405. Sub-process 405 can include steps for obtaining and processing stored metadata. In particular, the memory interface can read the stored metadata from a particular physical location of the non-volatile memory at step 406, select the whitening key at step 408, generate an initialization vector based on the particular physical location at step 410, and decrypt the metadata using the whitening key and generated initialization vector. Then, having decrypted the metadata, the memory interface can interpret the metadata at step 412 to determine the physical address of the data requested by the read command.

Process 400 can then continue to sub-process 413, which includes steps to read, process, and provide the requested data to the file system. Starting with step 414, the memory interface can read the stored data from the physical address previously determined from the metadata. Then, the memory interface can either select a privacy key and IV received from the file system (for sensitive data) at step 418, or select the whitening key and generate an IV based on the logical address (for non-sensitive data) at steps 420 and 422. Following steps 418 or 422, the memory interface can decrypt the sensitive or non-sensitive data using the selected/generated key and initialization vector. This can produce the original, un-whitened data requested by the file system, and memory interface can provide this data to the file system at step 426. Process 400 may then end at step 428.

Referring now to FIG. 5, a flowchart of illustrative process 500 is shown, which can be executed by the memory interface to move data between physical pages and/or blocks of the non-volatile memory (e.g., Flash memory). The data may be moved from one physical location to another for a variety of different reasons. For example, the memory interface may move data or metadata when performing wear leveling to even out the distribution of erases and re-writes on the non-volatile memory. Alternatively, the memory interface may move data or metadata out of a block of memory cells to free up the block for erasing or to discontinue use of the block when its reliability substantially decreases. Since the memory interface (and particularly a translation layer) can initiate page remapping for a variety of different reasons, the steps of process 500 focus primarily on the way in which data is (or is not) encrypted/decrypted when moved, and not on the particular management operations being performed. It should be understood that this is merely to prevent overcomplicating the figure, and the general features of process 500 can be incorporated into or adapted for any memory management operations that involve moving data between different physical addresses of non-volatile memory.

Process 500 can start at step 502. Then, at step 504, the memory interface can read a page from a physical address of the non-volatile memory. At step 506, the memory interface can determine what type of data the page contains. For example, the memory interface can determine whether the page contains data (e.g., sensitive or non-sensitive data) or metadata based on where the page was located within a block or using any other suitable approach. If the page includes data, the memory interface can store the data in a new physical address at step 508. The memory interface can store the data at the new physical page address without having to use the encryption module to decrypt and re-encrypt the data. That is, the memory interface can disable or bypass the encryption module while moving the data. This is because the data, whether sensitive or not, may have been encrypted originally using encryption seeds independent of the physical address of the data. Thus, changes in the physical address of the data may not affect how the data should be encrypted/whitened.

Following step 508, the memory interface can update the metadata corresponding to the stored data at step 510. This allows the memory interface to maintain a proper mapping between the logical address of the data (which remains unchanged) and the place where the data is actually written. Step 510 may include reading, updating, and writing the metadata corresponding to the data, since the metadata may itself be stored in the non-volatile memory. These steps are not shown in FIG. 5 to prevent overcomplicating the figure, but can include steps similar to those of writing and reading metadata discussed above in connection with FIGS. 3 and 4.

Returning to step 506, if the memory interface determines that the page read at step 504 includes metadata, process 500 can move to step 512. Unlike with sensitive or non-sensitive data, metadata may need to be decrypted and re-encrypted when moved from one physical location to another. As discussed above, this may be because decryption of metadata involves using the physical address of where the metadata is stored (and not the logical address), and therefore changes in the physical address may require changes in the encryption to keep management of the metadata up-to-date. Thus, at step 512, the memory interface can generate an initialization vector based on the physical address at which the metadata was stored. The metadata may then be decrypted using the generated initialization vector and the whitening key at step 514. Then, at step 516, the memory interface may generate a new initialization vector based on the new physical address at which the metadata will be stored, and at step 518, can re-encrypt the metadata using the new initialization vector and the whitening key. The re-encrypted metadata may then be stored at the new physical address at step 520.

Following step 510 or step 520, process 500 can continue to step 522. At step 522, the memory interface can determine whether to move additional pages. If so, process 500 can return to step 504 and the memory interface can read data from another physical address. Otherwise, process 500 can move to step 524 and end.

It should be understood that the processes of FIGS. 3-5 are merely illustrative. Any steps can be added, modified, combined, or rearranged, and any additional steps may be added, without departing from the scope of the invention. For example, if an encryption module uses encryption seeds other than a key and an IV, one could modify the steps in FIGS. 3-5 to generate different encryption seeds, where the encryptions seeds for metadata may be based on physical addresses and the seeds for sensitive and non-sensitive data may be based on logical addresses.

Also, the various embodiments of the disclosure for storing information in a non-volatile memory have focused on storing sensitive data, non-sensitive data, and memory management data (or "metadata"). It should be understood that this is merely illustrative, and the features of the disclosure can be used in device implementations where the stored information does not fall into these three categories. In particular, for other device implementations, the device can use encryption seeds based on a logical address whenever possible (so that moving data may be more efficient) and the device can use a physical address when no logical address is provided. For encryption seeds not based on an address, the device can use a whitening key or other predetermined key when a privacy key is not provided, where the whitening key may be selected for its capability in providing a high degree of whitening.

The described embodiments of the invention are presented for the purpose of illustration and not of limitation, and the invention is only limited by the claims that follow.

What is claimed is:

1. A system comprising:
   non-volatile memory; and
   a system-on-a-chip (SoC) comprising:
   an encryption module configured to encrypt data according to one of an encryption key and a whitening key, the data comprising at least one of sensitive data, non-sensitive data, and memory management data; and
   a memory interface coupled to the encryption module, wherein the memory interface is configured to store the encrypted data in the non-volatile memory,
   wherein the encryption module is directed by the memory interface to:
   encrypt the sensitive data using the encryption key; and
   encrypt at least the non-sensitive data using the whitening key, thereby ensuring that at least the non-sensitive data is whitened prior to being stored in the non-volatile memory.

2. The system of claim 1, wherein the non-volatile memory comprises NAND Flash.

3. The system of claim 1, wherein the encryption module comprises an Advanced Encryption Standard (AES) engine.

4. The system of claim 1, wherein:
   the SoC further comprises a file system configured to issue commands to the memory interface to exchange the sensitive and non-sensitive data with the non-volatile memory; and
   the memory interface comprises a memory translation layer configured to generate the memory management data for managing the storage of the sensitive or the non-sensitive data in the non-volatile memory.

5. The system of claim 4, wherein the file system is further configured to provide an encryption key with the sensitive data, and wherein the file system is further configured to provide no encryption key with the non-sensitive data.

6. Apparatus for managing storage of user data in a non-volatile memory, the apparatus comprising:
   a memory interface configured to:
   generate memory management data for the user data,
   select a first physical address of the non-volatile memory at which to store the memory management data,
   compute a first encryption seed based on the selected first physical address,
   compute a second encryption seed that is independent of a second physical address of the non-volatile memory associated with the user data; and
   an encryption module configured to randomize the memory management data using the first encryption seed for storage at the selected first physical address and randomize the user data using the second encryption seed for storage at the second physical address.

7. The apparatus of claim 6, wherein the memory interface comprises:
   a memory controller configured to program the randomized memory management data into the non-volatile memory.

8. The apparatus of claim 6, wherein the encryption module comprises an Advanced Encryption Standard (AES) engine, and wherein the first encryption seed comprises an initialization vector.

9. The apparatus of claim 8, wherein the memory interface is further configured to:
select a predetermined key as a secret key for the AES engine, wherein the predetermined key is independent of a value of the selected first physical address.

10. The apparatus of claim 6, wherein the memory management data comprises memory map information that associates a logical address of the user data with the second physical address of the user data.

11. The apparatus of claim 6, wherein the memory interface is further configured to:
   direct the encryption module to decrypt the memory management data using the first encryption seed;
   select a third physical address of the non-volatile memory at which to store the memory management data;
   compute a third encryption seed based on the selected third physical address; and
   direct the encryption module to randomize the memory management data using the third encryption seed for storage in the non-volatile memory at the selected third physical address.

12. A memory interface for managing a non-volatile memory and operable to communicate with an encryption module, the memory interface configured to:
   receive a command to store information at a logical address, wherein the information comprises non-sensitive data;
   generate an encryption seed based on the logical address;
   direct the encryption module to encrypt the information using the encryption seed for storage in a first physical address of the non-volatile memory; and
   bypass decryption of the information when moving the encrypted information from the first physical address to a second physical address of the non-volatile memory.

13. The memory interface of claim 12, wherein the memory interface is further configured to:
   detect that the information comprises non-sensitive data based on the command lacking at least one encryption seed.

14. The memory interface of claim 12, wherein the memory interface is configured to:
   initiate garbage collection for the non-volatile memory, wherein the encrypted information is moved from the first physical address to a second physical address during the garbage collection.

15. The memory interface of claim 12, wherein the memory interface is operable to communicate with a file system, and wherein the command is received from the file system.

16. The memory interface of claim 12, wherein the memory interface is further configured to:
   update memory management data to associate the logical address with the second physical address;
   receive a read command to retrieve the information from the logical address;
   determine the second physical location using the memory management data;
   re-generate the encryption seed based on the logical address; and
   direct the encryption module to decrypt the information using the re-generated encryption seed.

* * * * *

UNITED STATES PATENT AND TRADEMARK OFFICE
CERTIFICATE OF CORRECTION

PATENT NO. : 8,589,700 B2  
APPLICATION NO. : 12/398090  
DATED : November 19, 2013  
INVENTOR(S) : Kenneth Herman et al.

Page 1 of 1

It is certified that error appears in the above-identified patent and that said Letters Patent is hereby corrected as shown below:

Claims

In Column 11, Line 47, Claim 6, delete "address," and insert -- address, and --, therefor.

Signed and Sealed this  
Sixteenth Day of February, 2016

Michelle K. Lee  
*Director of the United States Patent and Trademark Office*